United States Patent [19]

Hevenor, Jr.

[11] 4,352,165
[45] Sep. 28, 1982

[54] APPARATUS FOR STORING AND RETRIEVING DATA

[75] Inventor: Charles M. Hevenor, Jr., Bolton, Conn.

[73] Assignee: The Gerber Scientific Instrument Company, South Windsor, Conn.

[21] Appl. No.: 104,196

[22] Filed: Dec. 17, 1979

[51] Int. Cl.³ .......................... G06F 13/04; G06F 3/06
[52] U.S. Cl. .................................................. 364/900
[58] Field of Search ... 364/200 MS File, 900 MS File, 364/520; 340/679,680, 706, 798, 748

[56] References Cited

U.S. PATENT DOCUMENTS

3,480,943 11/1969 Manber .............................. 340/748
3,720,948 3/1973 Eichen et al. ....................... 364/900
3,742,289 6/1973 Koeijmans .......................... 364/900
4,058,849 11/1977 Fitzgerald et al. .............. 364/900 X Primary Examiner—Harvey E. Springborn
Attorney, Agent, or Firm—McCormick, Paulding & Huber

[57] ABSTRACT

An automated artwork generation system employs a video display and a microprocessor for verifying and editing data derived from a digitizer and utilized by a photoplotter. The system includes a data storage and retrieval apparatus in which data processed through the system is stored. The apparatus permits random access to data in a memory, and both the storing and retrieval times are minimized by establishing a direct relationship between the zone of a workpiece in which data is located and the portion of the memory in which the data is stored. Data entries in the memory are made in both a data entry file and a bulk data file. The entry file serves as an index to the bulk data file and contains abbreviated data entries and pointers identifying addresses in the bulk data file where additional related data is stored.

9 Claims, 8 Drawing Figures

APPARATUS FOR STORING AND RETRIEVING DATA

BACKGROUND OF THE INVENTION

The present invention relates to data processing systems in general and is concerned more particularly with an and apparatus for storing and retrieving data in such systems.

A wide variety of memory or storage devices are employed with data processing systems, and each memory device has its own advantages and disadvantages. Factors such as storage capacity, access time, volatility, cost and compatability with a particular machine or function determine whether one device or another is used. Currently disc memories are used for systems requiring a moderate amount of permanent memory capacity because they are reliable, relatively simple mechanical devices and inexpensive. One type of disc that has received wide acceptance is the floppy disc because of its rugged durability and relatively low cost. The floppy disc also operates in low cost drive units; however, the performance of such systems is compromised and in random access systems, access times can be relatively long.

The access time as stated above is one of the critical considerations in determining whether a particular memory device is suitable for given purpose. For example, in an automated artwork generation system having a work station at which a person operates with a video display to create graphic designs, access times for retrieving data shown in the display would be unacceptable if a data point could only be extracted from a floppy disc by scanning the complete disc for the selected data. On the other hand, if the access times could be reduced to periods of one second or less, the disc system would adequately serve the purpose of a memory device in the artwork generation system.

It is accordingly a general object of the present invention to provide apparatus for obtaining direct access to data within a memory device that moves a storage medium relative to a memory head. It is a further object of the invention to provide in an automated artwork generation system a low cost data storage and retrieval apparatus that is particularly suited to the system and does not require extended access times for storing or retrieving data.

SUMMARY OF THE INVENTION

The present invention relates to an apparatus for storing and retrieving data and has utility in artwork generation systems and the like in which access times in the order of one second or less are compatible with other system operations.

Access times in a memory device that moves a storage medium relative to a memory head can be reduced by providing some means for moving the head and medium directly into a positional relationship which puts the head within reasonable proximity of the memory location where data sought is stored. By such technique the scanning of large amounts of data is avoided and the access time is basically limited to that period of time for moving the head and recording medium into adjacent relationship at the memory location for the data. The present invention employs this technique and is particularly suited to a system for processing data relating to a graphic workpiece.

The improved data storage and retrieval apparatus for handling such data includes a data storage member which is divided into discrete storage areas for storing data from corresponding zones of a graphic workpiece. The data entries in a given storage area are derived from one zone but may be arranged in random order in memory locations within that area of the storage member. For example, if the storage member is a disc having memory tracks divided into sectors, one sector with a plurality of memory locations may be set aside for recording data from one geometric zone of the graphic workpiece.

The storage and retrieval apparatus further includes a memory head mounted for movement relative to the data storage member and cooperative with the member for reading data at various memory locations in the storage areas. The memory head in a floppy disc system, for example, is moved radially relative to the disc for alignment with the disc tracks, and the disc is constantly rotated to bring each of the memory locations in a given track into juxtaposition with the head for data storage or retrieval.

Controls responsive to zone addresses are provided for moving the memory head and storage member relative to one another and thereby bringing the head and memory locations for selected zones into corresponding relationship. Direct access to the memory locations by the controls is achieved by establishing a table of memory locations in the storage member for data associated with given zones. The memory head is then vectored directly to the memory locations for a zone and a small number of memory locations are scanned for a match with the coordinates of data being sought.

In a further embodiment of the invention, the stored data is recorded in an abbreviated form in an entry index file to which direct access is gained as described above. More complete or additional data is stored in a bulk data file elsewhere on the storage member. Vectoring from the entry file to the bulk data file is achieved by a pointer in the entry index which identifies the memory address in the bulk data file where the additional data is stored. Thus by two direct accessing steps, a substantial quantity of data is obtained.

The invention constitutes an improvement over prior art storage methods and apparatus by permitting direct access to data based upon information identifying the data in a graphic workpiece. Direct access is made possible by correlating the data storage locations in the memory with geometric zones in the workpiece. The invention permits relatively low performance storage devices to serve in the capacity of high performance devices without the additional costs.

DESCRIPTION OF THE PREFERRED EMBODIMENTS

Figure 1:
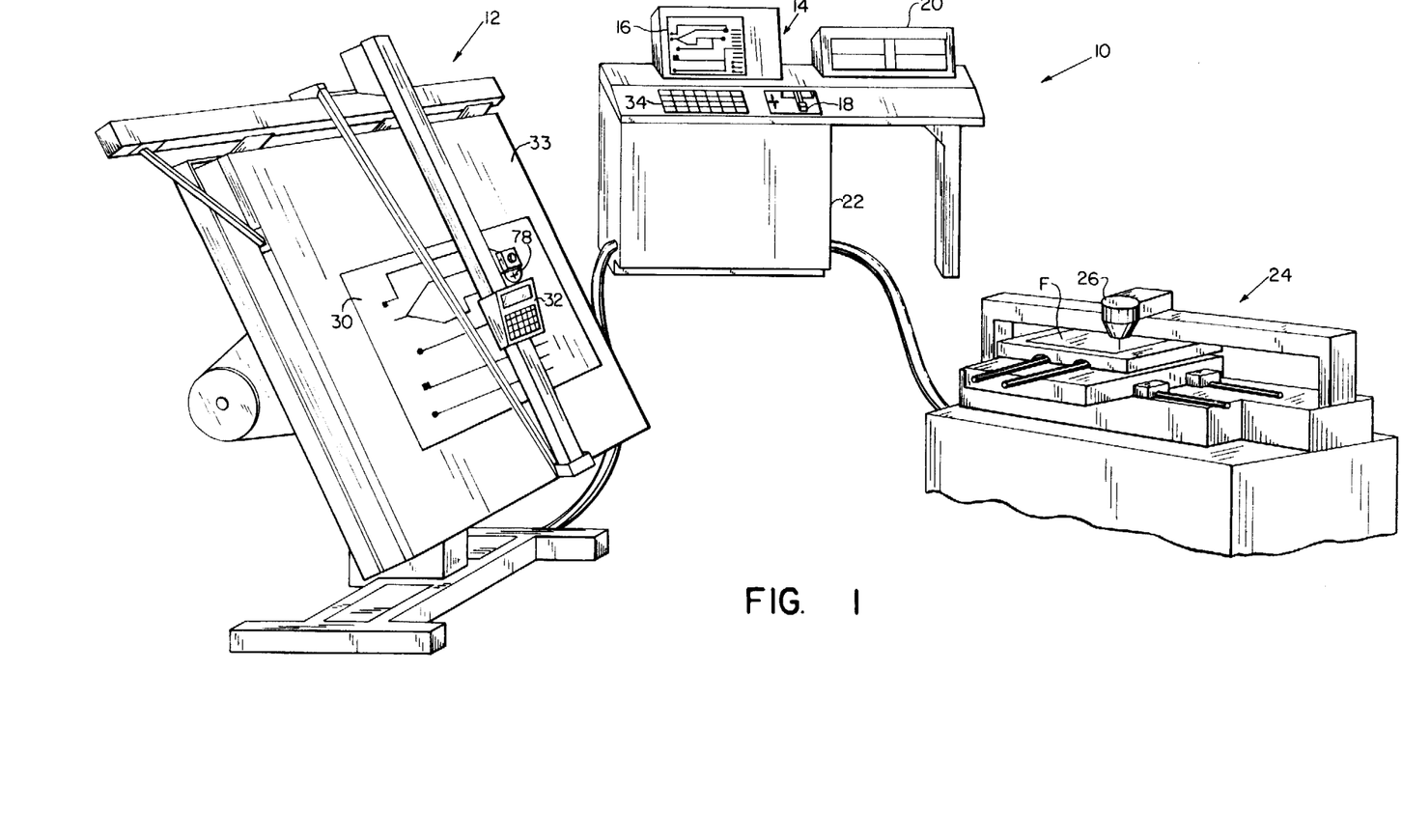
FIG. 1 is a perspective view of an automated artwork generation system in which the present invention is employed.

FIG. 1 illustrates an automated artwork generation system in which the present invention is employed; however, it should be understood that the utility in the invention is not limited to the particular system illustrated or described hereinafter and can be used in a number of other systems for recording graphic data, particularly those employing a data memory which includes a memory head and storage medium that are physically moved relatively to one another to obtain access to different memory locations. Such memory devices would include tape systems, drum systems, disc systems, card systems and others.

The artwork generation system, generally designated 10 in FIG. 1, is employed by an operator to design graphic workpieces representative of articles such as circuitboards, structural components, electrical diagrams, maps and numerous other articles animate and otherwise which are capable of being represented in a two-dimensional display. The system enables the operator to develop and modify the graphic representation or workpiece with computer assistance.

The basic components illustrated in the artwork generation system include a large area, coordinate digitizer 12, a work station for the operator including a graphic data control 14 having a video display 16 and cursor control 18, a floppy disc unit 20, a main processor unit 22, and a photoplotter 24 having a photohead 26.

The digitizer 12 is utilized to transform a graphic workpiece on a drawing 30 into a data base that with the aid of the graphic data control 14 and the main processor unit 22 is stored in the disc unit 20, edited and verified by means of the data control 14 and utilized by the photoplotter 24. The digitizer includes a console 32 that is manually traversed over the drawing board 33 and has controls for identifying and recording the data extracted from the graphic material on the drawing 30.

The data base developed by the digitizer 12 is processed from the digitizer 12 through the main processor unit 22 for storage in the floppy disc unit 20. The processor unit in one embodiment is a microprocessor of a type manufactured for example by Hewlett Packard of Cupertino, Calif., model HP2108M available on the filing date of this application, and the floppy disc unit is a dual disc unit and serves as the primary memory of the system. The operations of the microprocessor are established by a program disc in the unit 20 and data from the digitizer is stored on a data disc also within the unit.

The graphic data control 14 is used to edit and verify the data base developed by the digitizer. Editing permitted by the control includes additions, deletions and modifications of all forms of graphic data in the workpiece that has been recorded. To accomplish these functions, the graphic data is reproduced in the video display 16 and the operator manipulates the cursor control 18 to identify data points in the display, and data is appropriately changed through the keyboard 34. Other functions such as shading, line-connecting and printing can also be controlled through the keyboard.

When the graphic workpiece has been finalized on the video display, the data defining the workpiece is stored in the floppy disc unit 20, and the photoplotter 24 is employed to produce the workpiece in a usable form. For example, if the workpiece represents one side or level of a printed circuitboard, the photoplotter 24 plots the conductor pattern on a photographic film F, and that film is subsequently used as a mask in a photoetching process by which the circuitboard is manufactured. Of course, other data input or output devices than the graphic data control 14 or the photoplotter 24 may be connected with the data disc and the main processor to produce a wide range of end products.

Figure 2:
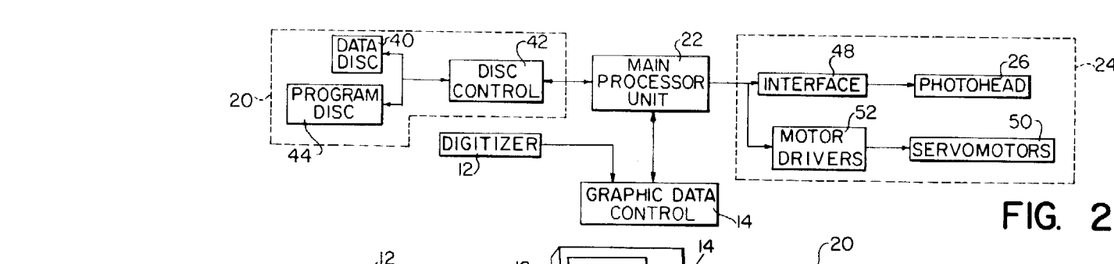
FIG. 2 is a functional block diagram illustrating the principal components in the artwork generation system of FIG. 1.

FIG. 2 illustrates the principal components of the automated artwork generation system in a control diagram. It will be observed that the main processor unit 22 handles the flow of data between the various other components of the system. The graphic data control 14 serves as a data input device since edited data generated by means of the cursor control 18 and the keyboard 34 is retained for subsequent use by the photoplotter 24 or other output devices. The data control 14 also serves as a data output device since the data base provided by the digitizer 12 is reproduced on the video display 16 for editing and verification. All of the data flowing between the input and output devices is stored in a data disc 40 in the floppy disc unit. A disc control 42 regulates the flow of data to and from the disc 40 and regulates the transfer of information between a program disc 44 and the main processor unit 22. The program disc contains the software program that governs the operation of the main processor unit and establishes, for example, the operations performed by the processor as part of the artwork generation system.

The processor unit also controls the photoplotter 24. Command signals for operating the photohead 26 are supplied through an interface circuit 48, and displacement commands are supplied to the servomotors 50 through motor drivers 52. The servomotors cause the film F and photohead 26 in FIG. 1 to move relative to one another while the film is exposed by the photohead. The head includes apertures and other controls such as described in U.S. Pat. No. 3,330,182 having the same assignee as the present invention for drawing continuous lines, flashing specially shaped images or "pads" and exposing other graphic images optically with high accuracy on the film.

Figure 3:
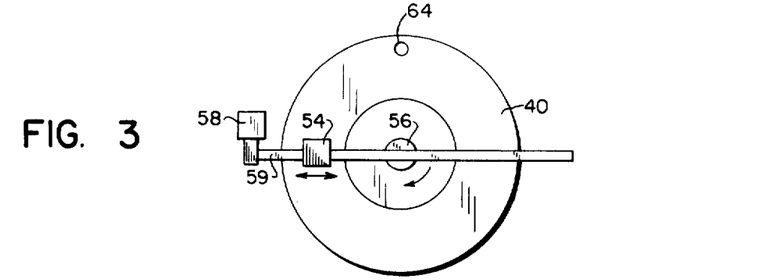
FIG. 3 is a plan view of a floppy disc unit showing the floppy disc and a memory head for recording and retrieving data on the disc.

The present invention relates to the apparatus by which data is stored and recalled from a memory device such as the data disc 40. It will be understood that when data is entered on the disc from the digitizer 12 or when data is retrieved for verification or editing on the video display 16, the disc control 42 must move a memory head within the disc unit 20 and the disc 40 into a particular positional relationship in order for the head to read magnetically encoded data at a selected address on the disc. FIG. 3 schematically illustrates the data disc 40 and a memory head 54 which reads and records data on the disc. The disc 40 is mounted on a spindle 56 and is constantly rotated by the spindle when the system is in operation. A small stepmotor 58 rotates a lead screw 59 engaged with the memory head 54 to cause the head to move radially relative to the disc as indicated by the arrows. Through the cooperative motions of the head and disc, the head can be brought into momentary registration with a particular memory location on the disc to allow the encoded data to be recorded or read. (The program disc 44 is read in the same manner by a corresponding memory head in the disc control 20.)

Figure 4:
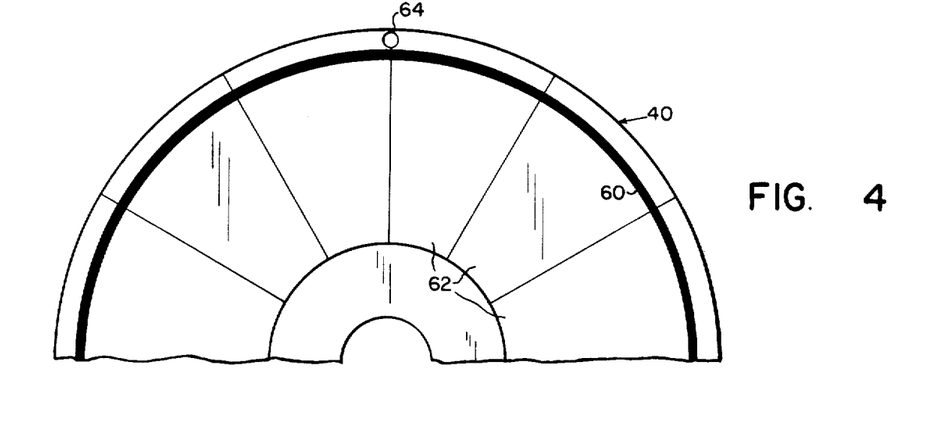
FIG. 4 is a fragmentary view of a floppy disc showing the tracks and sectors into which the memory area is divided.

FIG. 4 illustrates the manner in which the memory area of the disc 40 is divided into a plurality of tracks 60 (only one shown) and sectors 62 in which data is magnetically stored in digital form at a plurality of memory locations. Each track 60 extends circumaxially about the disc through the sectors 62 and contains a large number of discrete memory locations. A typical disc may have 72 tracks in 26 sectors of the memory area. Since each memory location for a piece of data, for example a 16-bit word, is small but finite in size, a large number of memory locations is included on the entire disc and the general area for any given memory location can be identified by correlation with a particular track and sector of the disc.

A reference aperture 64 is provided on the disc to establish a reference or synchronization pulse for measuring the location of the sectors or data circumaxially along a particular track.

To locate given data in the disc by a random accessing process would require far too much time if the complete memory area had to be searched by the memory head. In order to render the floppy disc memory suitable for the artwork generation system, data should be retrieved from the memory or stored within one second after the operator has designated the data on the video display or digitizer. Current state of the art in floppy disc systems does not allow complete scanning of the memory area within this brief period of time, but short access times are permitted by the direct accessing apparatus of the present invention.

In accordance with one aspect of the present invention, direct access to the memory for storage or retrieval of data is achieved by dividing the storage area of the data disc 40 into sections, e.g. one section being the track portion in one sector of the disc, and correlating each section with a single geometric zone of the artwork or graphic workpiece being recorded. All of the data thus stored in a particular section of the disc is associated with one zone which facilitates obtaining access to the memory section by data coordinates. Additionally, a memory residence table provided at a known position on the disc, for example in track 1, sector 1, correlates the zones and sections to permit means within the data processor 22 to directly calculate the address of a section where identified data is stored. Since a known section of the memory area can be reached in less than one second, the invention renders floppy disc units and other movable member devices quite compatible with automated artwork generation systems and other systems requiring the same access times.

In accordance with the further aspect of the present invention, the data entered in a particular section of the disc may be stored in a code or unique, abbreviated version of the data sufficient for identification purposes, and with a pointer which defines another memory address where additional data or a more complete description of the data is found.

Figures 5, 6:
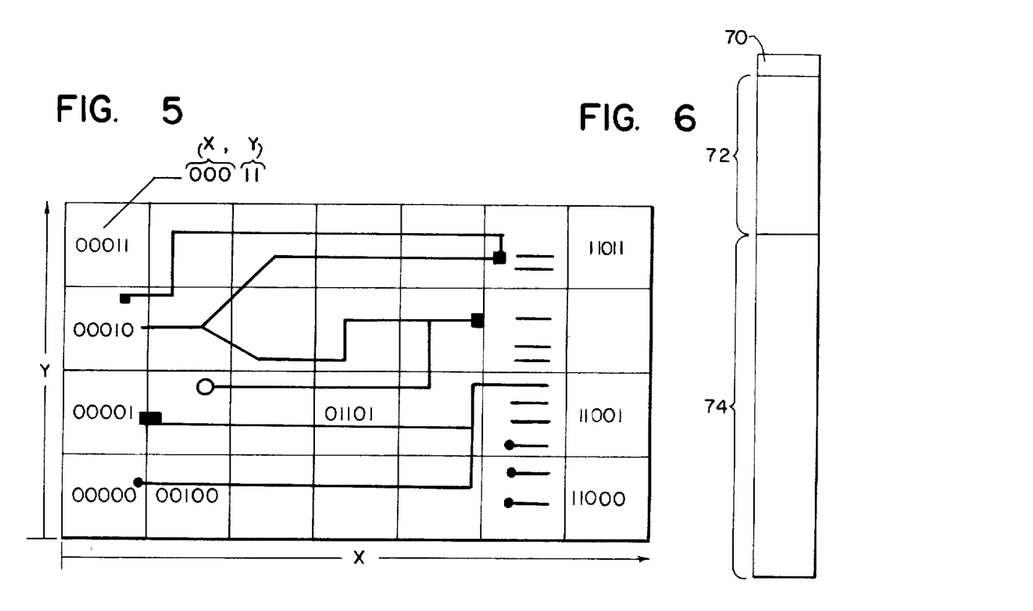
FIG. 5 is a zone diagram showing the zones into which a graphic workpiece is divided in one embodiment of the invention.
FIG. 6 is a schematic representation of the data format of the memory in one embodiment of the invention.

FIG. 5 illustrates a rectangular grid pattern with grid lines which divide a graphic workpiece into geometric zones for data storage and retrieval. In this example it is assumed that the workpiece or the area within the workpiece containing data to be recorded is rectangular although the actual configuration is immaterial. It is further assumed that the workpiece can be displayed in two dimensional form on the digitizer 12 with X and Y dimensions as shown in FIG. 5, but the invention can be extended to three dimensional displays as well. The number of zones into which the workpiece is divided is determined primarily by the density of the data to be recorded and the number of memory locations set aside for data in each section or region of the memory device. The number of memory locations in a section also depends somewhat upon the rate at which data can be searched by the processor unit for a match with identified data coordinates.

It is convenient to divide the zones by lines which are parallel to the X and Y axes since a zone address can then be fabricated by utilizing the most significant digits of coordinate points lying within the zones. For example, in the grid shown in FIG. 5 there are seven zones located along the X-coordinate axis and four zones along the Y-coordinate axis. The individual zones can be uniquely identified by a combination of two numbers representing respectively the zone offset from the origin of the coordinates. In decimal notation a zone identifier or address designated (0,0) would indicate the zone at the lower lefthand corner of the workpiece adjacent the origin of the coordinates, while an address designated (6,3) would designate the zone at the upper righthand corner. Since data is generally processed by the system in binary form, the zone addresses are designated by binary numbers which in the present example require two digits to represent the largest Y-offset of the zone and three digits to represent the X-offset. Thus for instance the zone at the upper lefthand corner of the workpiece is designated 00011 as shown in FIG. 5, and the indicated X and Y components of the address correspond to the three most-significant bits of the X-coordinates within that zone and the two most-significant bits of the Y-coordinates in that zone. In the present example, therefore, with seven zones along the X-axes and four zones along the Y-axes, binary notation of the zone address utilizes only five bits of the data coordinates in the zone. It will be observed that this numbering or addressing scheme for the zones results in a successive series of binary numbers for the zone addresses.

Designating the zone addresses in the same terms as the data coordinates simplifies the location of data within a storage memory where the data is recorded by zones. By determining the zone from the most significant digits of data in the zone, and by providing a table in the memory which yields the memory address where data for a particular zone is stored, direct access to the data can be obtained. In other words searching the memory for data is reduced to the steps of determining the memory address from the zone address and searching one section of the memory at the designated address. The zone address is determined directly from the data coordinates which are automatically produced by the digitizer 12 or the cursor control 18. Consequently the necessary information for automatic vectoring to a memory address is provided by the artwork generation system 10.

FIG. 6 illustrates the general format of information within the memory area of the disc 40 in one embodiment of the invention. For convenience the complete memory area on the disc is represented as one continuous column although, in fact, the data is distributed in the multiple tracks and sectors as explained above in connection with FIG. 4. The initial sections of the memory are occupied by a job header 70 which includes data concerning the job such as workpiece dimensions, scale factors, number of data entries and memory locations, current addresses, disc tracks and sectors and other operating information in addition to a memory residence table which defines the portions of the memory occupied by or reserved for the zone data. All this information is stored in the main processor unit at the beginning of each work operation for immediate reference during the operation. The remaining portions of the illustrated memory are devoted to data storage. One portion includes an entry file 72 which contains coded or abbreviated data and a pointer that identifies another address located in a bulk data file 74 of the memory. Additional information pertaining to a data point listed in the entry file is stored at the identified address in the bulk data file to complete the description of the listed data point. In building the data memory, the entry file is initially divided into groups of contiguous memory locations or regions, such as the portion of a track filling a disc sector, and each group of memory locations is associated respectively with a zone of the workpiece. Data is entered sequentially as digitized in the group set aside for a zone; however, the bulk data file is not divided in any special manner, and additional data from all zones is entered serially.

Figure 7:
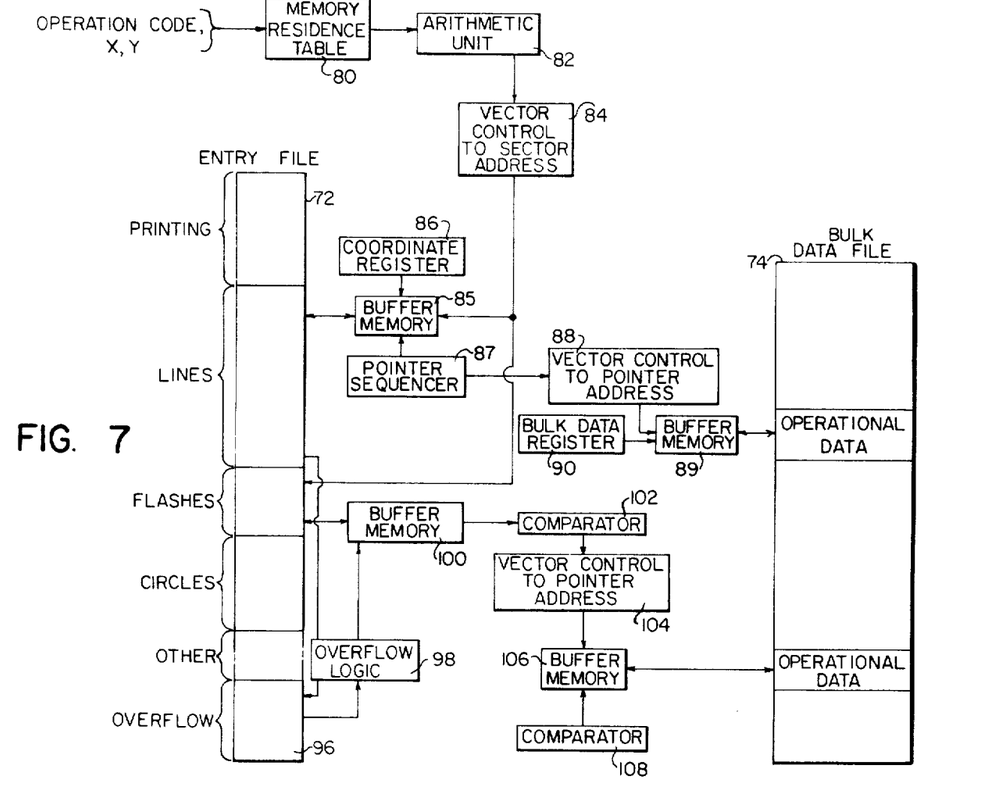
FIG. 7 is a diagram illustrating the processing of data for both storage and retrieval operations in accordance with the present invention.

FIG. 7 illustrates in a detailed diagram the composition of the entry file 72 and bulk data file 74 and the process by which data is both stored and retrieved from the files.

Initially the entry file of the memory is divided into sections or areas for storing data from corresponding zones of the graphic workpiece. As an example, let it be assumed that the memory locations within one sector of one track are reserved for data points from one zone so that a one-to-one relationship exists between the track sectors and zones. If there is too much data in each zone for the memory locations within a sector, then the operator has several choices to make. He can increase the number of sectors associated with a zone, or preferably increase the number of the zones on the workpiece and corresponding sectors in the entry file. Furthermore, he can classify the different data types by job operation or other characteristic, and establish separate portions of the entry file for data of each type with the same or different zone-sector relationships for each type. In the present case it will be assumed that the data represented in the graphic workpiece is classified by plotting operation and that because of different data type densities, different zoning grids are selected to maintain a one-to-one relationship between the zones and sectors of the floppy disc 40. As illustrated in FIG. 7 the classes of plotting operations defined by the data stored in the entry file include printing, lines, flashes, circles and other geometric forms that collectively encompass all of the plotting functions needed for a particular job or workpiece.

Additionally, the entry file includes an overflow section which is provided to accommodate the few instances in which data can not be stored in the memory locations of a sector assigned to a specific zone. The overflow section retains a one-to-one relationship between the zones and sectors except that only zone having overflow data have corresponding sectors in the oveflow sections.

Once the track sectors in the entry file have been assigned to corresponding zones of the workpiece, and the remaining sectors of the memory have been set aside for the bulk data file, the system is prepared to receive and store data from the graphic workpiece either on the drawing 30 or the video display 16.

In storing data the operator works either with the digitizer 12 associated with the drawing 30 or the graphic data control 14 associated with the display 16, and through appropriate keyboard entries he informs the main processor unit 22 of the fact that he is planning to store data of a given type. The program disc 44 in FIG. 2 provides the softwave information for directing data through the processor and onto the data disc 40 at an appropriate location in conjunction with the memory residence table on the data disc. The operator then moves an index 78 on the cursor console 32, or he moves the cursor control 18 of the interactive control 14, to identify a specified data point that he wishes to record. Let it be assumed that the operator wishes to store information defining data on the drawing 30 and that he has so advised the main processor unit 22 through the digitizer console 32. Every line, symbol or other character is identified by a tag point for geographic location as well as identification. For symbols that lie in a single zone the tag point falls on the symbol and within the zone; however, for lines which overlap a plurality of zones, one point of the line is chosen and identified by a tag point in the zone where the one point is situated. The tag points can be illustrated in the drawing being digitized and illuminated the interactive display 16.

An entry into the data disc as indicated in FIG. 7 must include the operation code for a particular geometry being recorded which focuses the disc control on the sectors of the entry file 72 set aside for that data function. In the present example, an operation code for line data is compared with the memory residence table now stored in a register 80 of the main processor unit, and by a simple cross reference or calculation based upon the number of sectors set aside, the appropriate track sectors for line data are identified in the entry index.

By means of the digitizer 12 or cursor control 18, the operator identifies the X and Y coordinates of a tag point associated with a line. Since the most significant bits of the coordinates also identify the zone address of the tag point, a simple calculation is carried out in the arithmetic unit 82 to determine the address of the track sector in the entry file to which all classified data having that zone address has been assigned. In the present case it is assumed that the memory residence table includes the displacement or memory address for the first zone in the "line " section of the entry file, and since one sector is allocated to each zone, the sector address for the data being recorded can be calculated by simply adding the numerical value of the zone address to the displacement or address of the first sector in the line section of the entry file. The arithmetic unit 82, therefore, may be comprised by a simple binary adder.

From the point of view of the operator, the steps of entering data up to this point are carried out instantaneously. However, the memory head must now be slewed by the vector control 84 to the track containing the addressed sector in the entry file. This motion of the head requires a finite interval of time, but not more than a half second which is quite tolerable. When the memory head reaches the correct track, the recording process does not start until the addressed sector on the rotating head passes under the head. As the sector rotates past the head, the memory head reads all of the memory locations in the sector and stores any recorded data in a buffer memory 85 which has a memory capacity at least equivalent to the memory capacity of one track sector. The main processor unit then causes the data coordinates of the tag point or "words" to be transferred from a coordinate register 86, where the coordinates are received from the digitizer 12, to the buffer memory 85 and the data are recorded in the first available set of memory locations not occupied by previously recorded data. In addition to the X and Y coordinates of the tag point, a third coordinate may be entered in the case of three dimensional products. For example, if the graphic workpiece illustrates the circuitry on a printed circuitboard, the third coordinate would identify the side of the board to which the artwork is applied. If the circuit represented one level of an integrated circuit mask, that level would be designated as the third coordinate.

In each case the coordinate data entered in the buffer memory is uniquely associated with the graphic information from the artwork or drawing 30, but does not necessarily completely identify that information. Additional data pertaining to a line such as other critical points along the line including the opposite end point and other operational data will be stored in the bulk data file. For this reason a pointer is generated by a pointer sequencer 87 and is entered in the buffer memory 85 with the coordinate data to identify an address in the bulk data file 74 where the additional data will be stored. The entire contents of the buffer memory including the newly entered coordinates and pointer are then reloaded into the entry file 72 at the track sector previously identified by the arithmetic unit 82.

It will be understood that since the data disc is continually rotating, the disc may complete one or more complete revolutions while data entries are made through the buffer memory. However, the time interval for a revolution is quite brief within the contemplated overall entry time of a second or less and, therefore the delay in returning the memory head and data disc to the addressed track sector is not significant.

When the abbreviated data is stored in the entry file, the memory head 54 in FIG. 3 is then slewed or vectored to the pointer address by the vector control 88 which is illustrated separately in the functional diagram of FIG. 7, but preferably is physically the same as control 84. The pointer address in the bulk data file 74 is located in another track sector on another track of the data disc 40 which could require up to another half second for access. At that time other operational data from the digitizer 12 is transferred from a bulk data register 90 through a buffer memory 89 to the first available set of memory locations in the bulk data file in a manner similar to transfers to the entry file. The memory head 54 then parks over the track containing the pointer address in the bulk data file, until new tag point coordinates are reported to the memory residence table in register 80.

It will be appreciated from the above that after data in the memory residence table has been read into the main processing unit 14 at the start of a data processing operation, only two motions of the memory head 54 are required to locate the appropriate memory locations for storing all of the data defining the line or other geometric data being recorded. These motions of the head first to the entry file and then to the bulk data file represent substantially the total access time since the step of calculating preformed by the arithmetic unit 82 is practically instantaneous and the steps of storing data from the registers 86 and 90 occur within a few rotations of the data disc. The total access time therefore, is limted to one second or less which is quite acceptable in the artwork generation system disclosed and many other systems as well.

When data defining a second and subsequent lines from the same zone of the graphic workpiece are digitized, the same steps are followed in identifying the address of the track sector where the tag point coordinates for the lines are to be stored. Since the coordinates for other lines in a zone will contain the same most-significant digits or "key" bits, the same sector address is calculated in the arithmetic unit 82, and the memory head is vectored to the same sector address. Data is entered sequentially within the addressed sector as digitized. Data is also entered sequentially in the bulk data file, and as each sector in the bulk data file is filled, the pointer sequencer is advanced to the address of the next sector.

Figure 8:
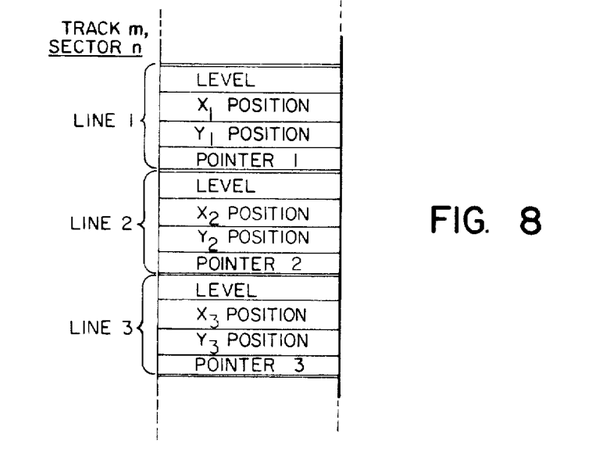
FIG. 8 is a fragmentary view of a data track and illustrates typical information that would be recorded in an entry file shown in FIG. 7.

FIG. 8 illustrates a portion of the entry file at the sector address—track m, sector n—where entries have been made for three separte lines in a given zone of the graphic workpiece. Each set of data associated with a particular line includes the X, Y coordinates of the tag point together with the level of the coordinates within the workpiece, and a pointer identifying the bulk data address where a more complete description of the line is recorded. Since the tag point for each line is unique to the line, the coordinate data for the tag point serves as an abbreviated identification or code for the data and allows the entry file to serve as an index to the bulk data file. The pointer identifies a track sector in the bulk data file plus a distinguishing code word and is derived from the sequencer 87 that is advanced each time a sector in the bulk data file is filled.

Consequently, data is recorded in the bulk data file sequentially as it is generated by the digitizer or other data input device. However, data is placed in the entry file by zone and sector address and data type. Within the sectors of both files the data is arranged in the order which the operator has carried out the digitizing process. Within any sector, data for a particular line or other art form is grouped together.

In some cases where the data of one type is particularly dense in a given zone of the graphic workpiece, there may be insufficient memory locations within one sector of the data disc 40 to record all of the data entries. For such cases, an overflow section 96 is provided at the end of the data entry file as shown in FIG. 7. When all of the memory locations in one sector are filled, storing of the data from the coordinate register 86 is delayed until the memory head reloads the data from the filled sector back into the addressed sector and the data in the overflow section has been loaded into the buffer memory 85. The steps of reloading and vectoring to the overflow section for entry of data are carried out by the overflow logic 98, but otherwise are substantially the same as making entries into the sector addressed by the arithmetic unit 82. Thus, data is entered by sectors and corresponding zones in the overflow section. Alternatively, sequential entries of data could be made without regard to the zone-sector relationship.

Since the overflow section may not be located in the same track as the sector addressed by the arithmetic unit 82, additional slewing of the memory head to the overflow section may be required with a slight increase in access time for those zones producing overflow data.

However, such instances are rare if the zone selection is made to accommodate the more dense zones in a single disc sector, and the additional delay in reaching the overflow zone is not significant or perceptible to the operator in any event.

In summary, random access to memory locations for storage of data can be achieved by two vectoring steps directly to the regions of the memory where the data is stored. Scanning of the complete memory which is time consuming is not required, and the vectoring steps collectively take not more than a second with current drive units.

While the preceding description concerns the process for storing data on the data disc, the retrieval of data from the data disc in a brief period of time is also an important performance requirement.

In the present invention, retrieval is based upon coordinate and data-type information just as storing, and is accomplished in approximately the same access time. Retrieval is necessary, for example, while the machine operator is editing the workpiece through the video display 16 of the graphic data control 14. Also, the plotting operations performed by the photoplotter 24 require retrieval of all the data. Retrieval of data for editing on the video display requires first that the operator identify the data by type which is done through the control keyboard 34 in FIG. 1 and which focuses on a certain section of the entry file. Identification of the data in the file is accomplished through the data coordinates by means of the cursor control 18. Vectoring to the data is executed by determining the zone address as described above and calculating the address of the track sector where the data is stored.

Reference again to FIG. 7 reveals the details of the retrieval operation and the similarity to the storage operation. The data disc is entered with the operation code and tag point coordinates through the register 80 containing the memory residence table. In the arithmetic unit 82 the track sector address for the data is calculated from the zone address as before. The memory head is then vectored to the sector address by the control 84.

For purposes of discussion, it will be assumed that flash data is being recalled. When the memory head reaches the sector address, the head reads all of the data stored in the sector into a buffer memory 100 which may be the same memory in the main processor unit as the buffer memory 85. That data is then scanned by a comparator 102 to match the identified data coordinates with the recorded tag point coordinates in the buffer memory. If data has been stored in the overflow section 96 of the entry file, an entry is made at the end of the addressed sector, and the corresponding sector in the overflow section is subsequently loaded into the memory register through the overflow logic 98 for scanning by the comparator 102 also.

When a match (or near match) is located by the comparator, the head is slewed or vectored by the vector control 104, preferably the same as controls 84 and 88, to the pointer address in the bulk data file where all of the recorded data in the addressed sector is read into the buffer memory 106 which may be the same as memories 85, 89 or 100. Complete information defining the data is identified by the code word recorded in the entry file with the pointer address through a matching step performed by a comparator 108 which may be the same as comparator 102. The data is then modified, deleted or otherwise edited by the operator through the graphic data control 14.

It will be appreciated that random access to the data for retrieval purposes is carried out by the same two vectoring steps as for storing the data. Since these steps are executed in a brief period of time, the total access time is about the same, that is, less than one second, well within the tolerable limit for systems such as the artwork generation system described and others.

In summary, a large quantity of data defining a graphic workpiece can be stored in a data disc of a floppy disc unit, and the access times for the data can be kept to a reasonable length due to the unique correspondence of the data zones in the workpiece and track sectors on the data disc. Direct access is facilitated by correlating the data coordinates with a zone address and the zone address with a sector address by means of the memory residence table. The unique relationship of the workpiece and the data storage device established by the invention permits the use of a relatively inexpensive storage device without compromise on access times. The arrangement of data in the entry file by both job operation and zone of the workpiece also improves the efficiency of the plotter when data is recalled in the order set up in the entry file.

While the present invention has been described in a preferred embodiment, it should be understood that numerous modifications and substitutions can be had without departing from the spirit of the invention. For example, the invention has utility with many types of data systems and is particularly useful with systems recording graphic data. The short, random access times attained by floppy disc units are also available from other types of memory devices such as tape or drum systems in which a memory head is moved relative to a storage medium. Accordingly, the present invention has been described in a preferred embodiment by way of illustration rather than limitation.

I claim:

1. In a system for processing data defining a graphic workpiece and having a main processing unit controlling the processing of the data between a source and an output device for the data, an improved random access data storage and retrieval apparatus for storing and retrieving workpiece data comprising:

data memory means connected with the main processor unit for storing the data processed through said unit and including a data entry file in a storage medium having a plurality of physically distributed memory locations for storing data defining the workpiece, the memory locations in the file being divided geometrically into groups of contiguous locations, each group having a memory address corresponding to one of a plurality of defined geometric zones of the workpiece for entry of data from said defined zone and no other zone; and means for directly storing and retrieving data from the zones of the workpiece randomly in the corresponding groups of memory locations by means of has memory addresses, the data associated with a defined zone being stored in the entry file exclusively in the corresponding group of memory locations.

2. In a system for processing data, the improved random access data storage and retrieval apparatus as defined in claim 1 wherein:

the means for directly storing and retrieving data includes a data reader cooperating with the storage medium and means for controllably moving the reader and the medium relative to one another for access to the physically distributed memory locations.

3. In a system for processing data, the improved storage and retrieval apparatus as defined in claim 2 wherein the data storage medium is a floppy disc.

4. In a system for processing data, the improved random access data storage and retrieval apparatus as defined in claim 2 wherein:
 the storage medium in the data memory means includes in addition to said data entry file a bulk data file physically separate on the medium from the data entry file, the data entries in the memory locations of the entry file including a pointer identifying the address of a memory location in the bulk data file containing related, additional data; and
 the storage and retrieving means includes means for vectoring from the data in the entry file to the data in the bulk data file in accordance with the respective pointers.

5. In a system for processing data, an improved random access data storage and retrieval apparatus as defined in claim 1 wherein the means for directly storing and retrieving data includes means for deriving the memory address of each group in the data entry file from the coordinates of the data on the workpiece.

6. The random access storage and retrieval apparatus of claim 5 wherein the workpiece defined by the data has at least two coordinate axes, and the data memory means includes means for storing in memory locations data defining the workpiece in terms of data coordinates of the memory means, the data coordinates are measured along the coordinate axes of the workpiece, and the geometric zones of the workpiece are also defined by the same coordinate axes.

7. In a system for processing data, the improved storage and retrieval apparatus as defined in claim 6 wherein the means for deriving includes means for directly calculating the memory address in the data entry file portion of the storage medium from the data coordinates.

8. The improved storage and retrieval apparatus of claim 1 wherein:
 the data memory means additionally comprises a memory head movable relative to one another to read and store data at various addresses and distributed memory locations in the storage medium, the memory addresses being directly calculatable from the data locations in the workpiece; and
 the means for directly storing and retrieving data comprises means for calculating the memory address from the data locations and control means for moving the memory medium and head relative to one another to reach the calculated address, whereby direct access is achieved.

9. The improved storage and retrieval apparatus of claim 8 wherein the data in each zone of the workpiece is identified by position coordinates and a zone is identified by the most significant digits common to the position coordinates of all data in the zone, and the digits provide a successive series of zone addresses; the memory medium has a successive series of memory locations with addresses corresponding to the zone addresses; and the means for calculating includes means for calculating based upon the successive series of zone addresses and corresponding memory addresses.

* * * * *